Feb. 14, 1961    E. B. SILVERMAN    2,971,733
PORTABLE BOOKREST

Filed Feb. 14, 1958    9 Sheets-Sheet 1

*INVENTOR*
ELSIE B. SILVERMAN

BY  *Ely Silverman*

ATTORNEY

Feb. 14, 1961

E. B. SILVERMAN
PORTABLE BOOKREST 2,971,733

Filed Feb. 14, 1958

ELSIE B. SILVERMAN
INVENTOR

BY Ely Silverman

ATTORNEY

E. B. SILVERMAN
PORTABLE BOOKREST 2,971,733

Filed Feb. 14, 1958

ELSIE B. SILVERMAN
INVENTOR

BY *Ely Silverman*

ATTORNEY

Feb. 14, 1961   E. B. SILVERMAN   2,971,733
PORTABLE BOOKREST
Filed Feb. 14, 1958   9 Sheets—Sheet 6

FIG. 13

ELSIE B. SILVERMAN
INVENTOR

BY Ely Silverman
ATTORNEY

Feb. 14, 1961

E. B. SILVERMAN
PORTABLE BOOKREST 2,971,733

Filed Feb. 14, 1958

INVENTOR

ELSIE B. SILVERMAN

BY *Ely Silverman*

ATTORNEY

Feb. 14, 1961   E. B. SILVERMAN   2,971,733
PORTABLE BOOKREST

Filed Feb. 14, 1958

INVENTOR.
ELSIE B. SILVERMAN
BY
*Ely Silverman*
ATTORNEY

Feb. 14, 1961  E. B. SILVERMAN  2,971,733
PORTABLE BOOKREST
Filed Feb. 14, 1958  9 Sheets-Sheet 9

ELSIE B. SILVERMAN
INVENTOR.

BY Ely Silverman
ATTORNEY

United States Patent Office 2,971,733
Patented Feb. 14, 1961

2,971,733
PORTABLE BOOKREST
Elsie B. Silverman, 1405 Burch St., Borger, Tex.
Filed Feb. 14, 1958, Ser. No. 715,362
8 Claims. (Cl. 248—37)

My invention relates to improved collapsible bookrests for rigidly supporting books in inclined position and, more particularly to such a device which may be readily secured to a book and carried therewith.

An object of my invention is to provide an improved bookrest sufficiently simple, sturdy, and inexpensive to permit provision of a pair of such devices on each book, one on each cover.

Another object of my invention is the provision of such a bookrest that may be readily folded and flattened, and in such flattened state be carried within the cover of the book to which attached.

A further object of my invention is to produce a sturdy bookrest that may be made integral with a book cover or subsequently attached to the cover or book binding in a simple manner, or be removably attached to a book in a simple manner.

Yet another object of my invention is to produce a light yet sturdy bookrest that may be readily folded into a flattened position within the covers of a book, and when thus folded between the pages of the book and the cover is readily carried with said book and does not interfere with the storage of the book in an upright or in a horizontal position in a bookcase or other place of storage, does not interfere with the use of the book in a horizontal position and is readily and conveniently moved from such storage place into its operative position, or from its operative position to its storage position.

This invention is an improvement of my copending application Ser. No. 346,679, now Patent No. 2,823,488, issued on February 18, 1958.

Other objects and advantages of this invention will be clear from the following figures, which form a part of this specification.

My invention embodies the concept of a pair of bookrests which hold the book in a position of rearward inclination which renders inspection or reading of the contents of the open book most convenient and thus freeing the reader's hands and attention from such burden and allows his attention and efforts to be devoted to associated tasks such as writing or studying the text. These bookrests can be folded away into the book for transportation therewith and readily brought out to its operating position. For purposes of convenience each such bookrest must be flat enough to fold away within the books and so be adapted to be carried with the book at all times. However, for purposes of usefulness, the device must be rigid and dependable. When a bookrest made according to the teachings of the prior art is made of inexpensive light components or panels which are flat and thin enough to be carried between the covers of a book and its pages, such components do not have much compressive strength and bend and sag and fail in use. However, when bookrests made according to the teachings of the prior art are made of panels or components thick enough to not bend and sag when subjected to compressive stress such as is met in their use as compression members in bookrests, such panels are so thick that they do not conveniently fold into the book and, hence bookrests made with such panels are not readily portable and hence often not with the book when wanted.

My invention provides the desired result of forming portable inexpensive rigid book-supporting structures by using flat thin members so arranged in relation to each other as to cooperatively form rigid structures entirely adequate to not only support the book at a desired angle of rearward inclination, but also to provide structures that remain rigid on repeated movements of the book during their usage, which usage includes and permits sliding about of the book and its bookrest on a table—even raising the book and bookrests from the table—without affecting the angle at which the said book is regularly and reliably supported, and independently of the fraction of the total pages of the book adjacent to each cover. These structures are also made collapsible to a flat thin shape: this shape is sufficiently thin so that these structures may be carried between the cover of a book conveniently and without damage to the book. This result is made practical and convenient and reliable by (1) forming the bookrest of my invention of a plurality of cooperating thin members and (2) arranging the members of each bookrest which members take the principal compressive load involved in supporting the book so that those members are able to assume (a) the form of a rigid strong structure much stronger in compression along its length than the individual flat components of which it is composed as well as (b) the flat portable shape. Further, said members are not only arranged to cooperate with each other to provide such form but also so that they are readily and conveniently and positively brought to such rigid form. The rigidity and compressive strength of such rigid book-supporting structure result not so much from the mass or stiffness of the materials used for the panels, which are thin and not very stiff of themselves, but rather from the cooperation of the panel members. This cooperation results from their arrangement in the form of the expanded book-supporting structure. This rigid book-supporting structure is also provided with releasable locking means to conveniently and reliably hold the separate members in their cooperative positions; this structure is also arranged, according to my invention, so as to be readily and conveniently unlocked by release of the said locking means and then be folded to the flattened narrow shape. In this shape the bookrest is easily and conveniently carried within the cover of the book; this flattened narrow form may subsequently be readily unfolded from its flattened shape, expanded, and locked to form the rigid book-supporting structure.

Because the compression resistant member of the bookrest made according to my invention is joined to the book it supports through a foldable positioning member the length of the compression resistant member is limited only by the length of the book cover. The length of the compression resistant member may thus be varied easily relative to the length of the members which position it and relative to the length of the book it supports. Therefore the angle at which the book may be held by the bookrest may be chosen rather freely. This angle is preferably between 45 and 60 degrees to the horizontal. According to my invention there is no inconvenience due to the presence of such foldable positioning members because such foldable member or members are brought to a rigid and extended form by the same motion as that by which the separate flat panels are brought to the form in which they provide the rigid compression-resistant structure: accordingly when a book with book rest according to this invention is brought to the convenient inclined position at which it is to be supported, said one motion, simultaneously (a) forms the compression-resistant member from previously flattened panels and also (b) positively and conveniently fixes the position of the compression resistant member relative to a book cover edge.

The bookrests made according to this invention do not require expensive material and are inexpensive to make. The bookrests of this invention, as in the preferred embodiment, are preferably made from commonly available stiffened paper such as is found in 3 inch by 5 inch filing cards. Such paper is usually about 0.008 to 0.010 inch thick and is also known as 2-ply index stock. Similarly stiff paper of 5 to 12 thousandths of an inch thickness, such as manila file folder stock or kraft file folder stock, which latter are usually referred to as 2-ply kraft or 2 ply manila file folder stock, may be used in place of such index stock.

Also, rigid light metal sheet even thinner than the above paper stock or plastic sheet of thickness and stiffness such as exhibited by the above mentioned paper stock may be used to form the panels comprising this bookrest in place of said paper stocks.

Figure 9:
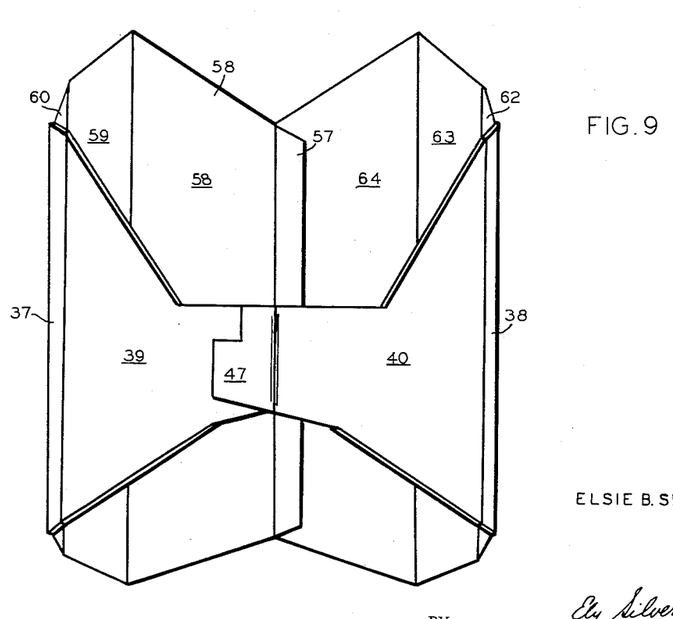
Figure 9 is a rear view of the preferred embodiment of my bookrest in its expanded book-supporting shape as viewed in the direction indicated by the arrow IX of Figure 7.
Figure 10:
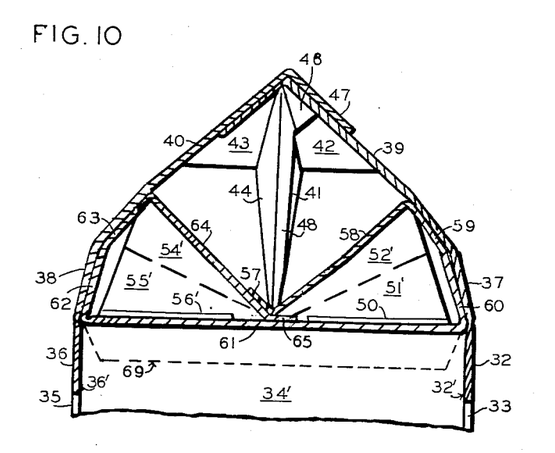
Figure 10 is a cross-sectional view of the bookrest in its expanded book-supporting shape as viewed in the plane indicated by the section line X—X' of Figure 7.
Figure 11:
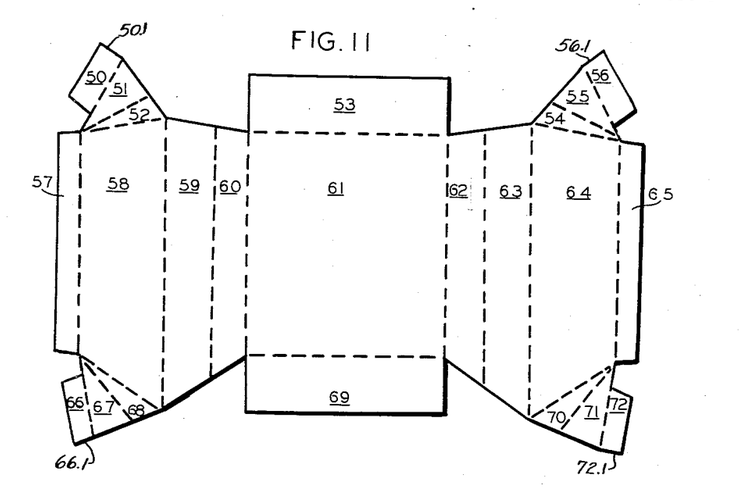
Figure 11 is a pattern for the first of two sheets with which to make the preferred embodiment of the bookrest shown in Figures 1, 7, 8, 9, and 10.
Figure 12:
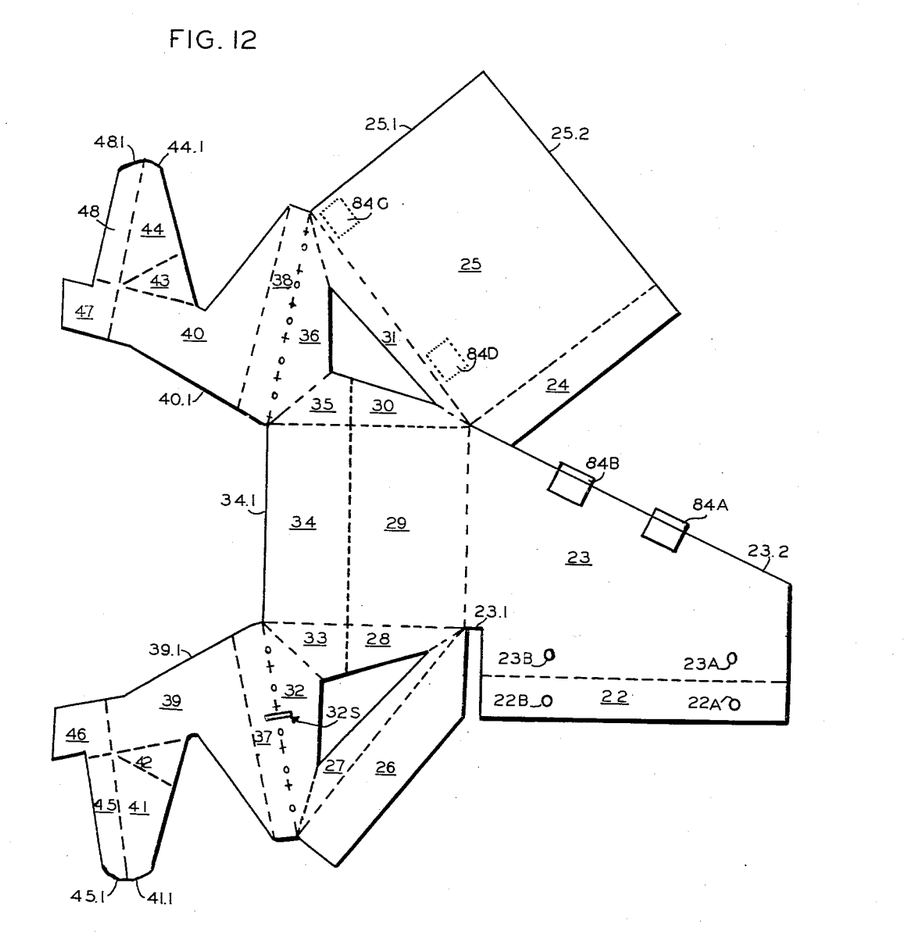
Figure 12 is a pattern for the second of two sheets with which to make the preferred embodiment of the bookrest shown in Figures 1, 7, 8, 9, and 10.

The strength normally exhibited by a bookrest made according to my invention is demonstrated by the following: a single bookrest, such as shown in Figures 1–17 made of but one thickness of $1/100$ inch thick index card stock paper in the form of the patterns shown in Figures 11 and 12 and of dimensions shown in the full scale Figures 7, 8, 9, 10, 13, 14, and 15 supports a book of 10.3 inches height, 6.8 inches width, 3.0 inches thickness having 1900 pages and weighing 5 pounds.

Figure 1:
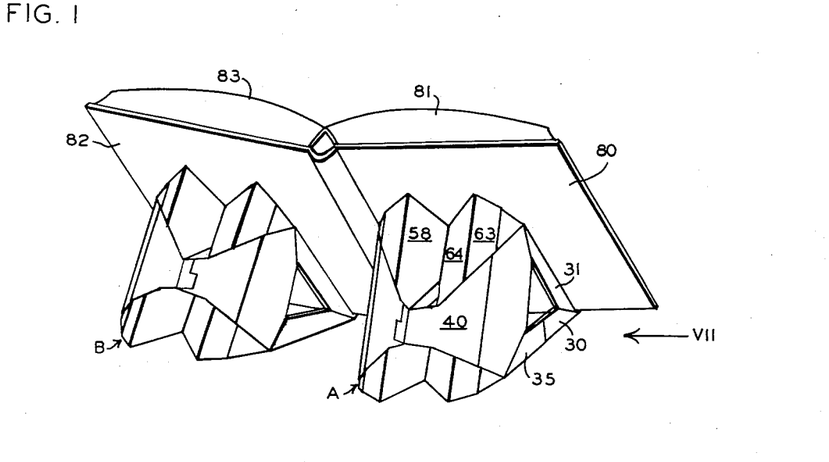
Figure 1 is a perspective view of an open book being supported by a pair of bookrests made according to the preferred embodiment of my invention.

Each book support, as A and B in Figure 1, supports a portion of the pages, 81 or 83, of the open book as well as the cover, 80 or 82, adjacent to such bookrest. B is a mirror image of A in the preferred embodiment of my invention. During the use of the book the portion, as 81 or 83, of the total pages of the book adjacent each cover may vary from none to all the pages of the book. As each bookrest may be slid backward or forward or from side to side while providing a firm and rigid support for the portion of the book adjacent thereto, the motions of the book covers relative to each other as the pages are shifted from adjacent one cover to adjacent the other do not affect the operativeness of my invention especially as each bookrest, as A or B, can support the entire weight of the book.

Figure 8:
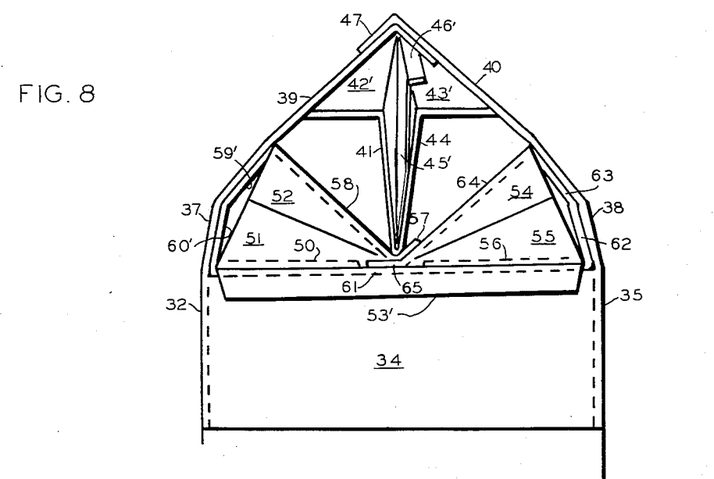
Figure 8 is a bottom view of the preferred embodiment of my bookrest in its expanded book-supporting shape as viewed in the direction indicated by the arrow VIII in Figure 7.

In accordance with a preferred embodiment of my invention, in a pair of bookrests A and B as shown in Figure 1, each such bookrest is made of panels foldably connected to each other as shown in Figures 11 and 12. These panels are each of a single thickness of conventional stiff index paper, such as is known in the trade as 2-ply, and of $1/100$ inch thickness. The panels are foldably connected by creasing the papers along the fold lines and there making folds. The panel numbers 22 through 72 used in this specification and in the drawings refer to the panel numbers shown in Figures 11 and 12. Panel surfaces on the reverse side of the pattern as shown on Figures 11 and 12 are indicated by the superscript ('); thus one surface of panel 34 is shown in Figure 8 and the reverse side of that panel, indicated as 34', is shown in Figure 10. In the specification and drawings a fold line referred to as line 61—62 means the fold line between panels shown as 61 and 62; fold line 61'—62' would be on the reverse side of the pattern. Fold lines shown in the drawings and referred to in this specification are shown as dashed lines in Figures 11 and 12. In all the figures other than 11 and 12 the fold lines are shown as full lines to distinguish between fold lines and hidden lines that, as is conventional, are shown as dashed.

Figures 2, 3, 4:
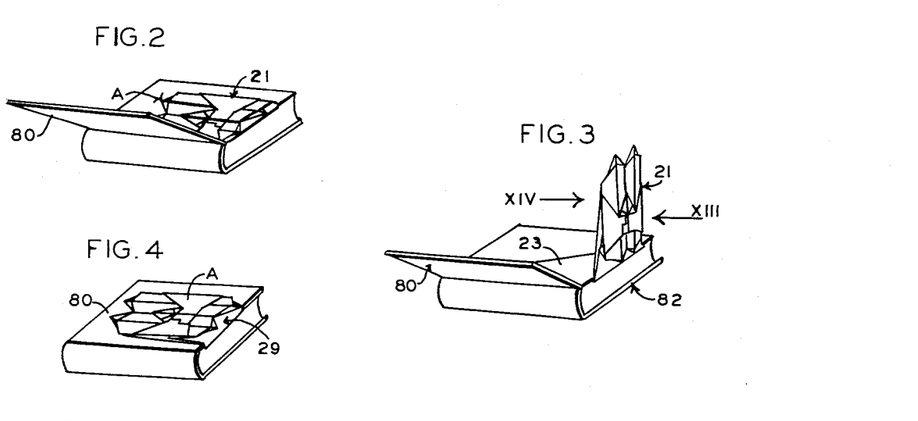
Figure 2 is a perspective view diagrammatically showing a bound book carrying a pair of bookrests made according to the preferred embodiment of my invention with one cover of the book open to show the position of the bookrest therein when said bookrest is in its folded collapsed condition.
Figure 3 is a perspective view of the book and bookrect of Figure 2 with the bookrest moved to a position whereby to bring the bookrest outside of the book cover.
Figure 4 is a perspective view of the book and bookrest of Figures 2 and 3 with said bookrest in its folded condition moved to the outside of the book cover.
Figure 13:
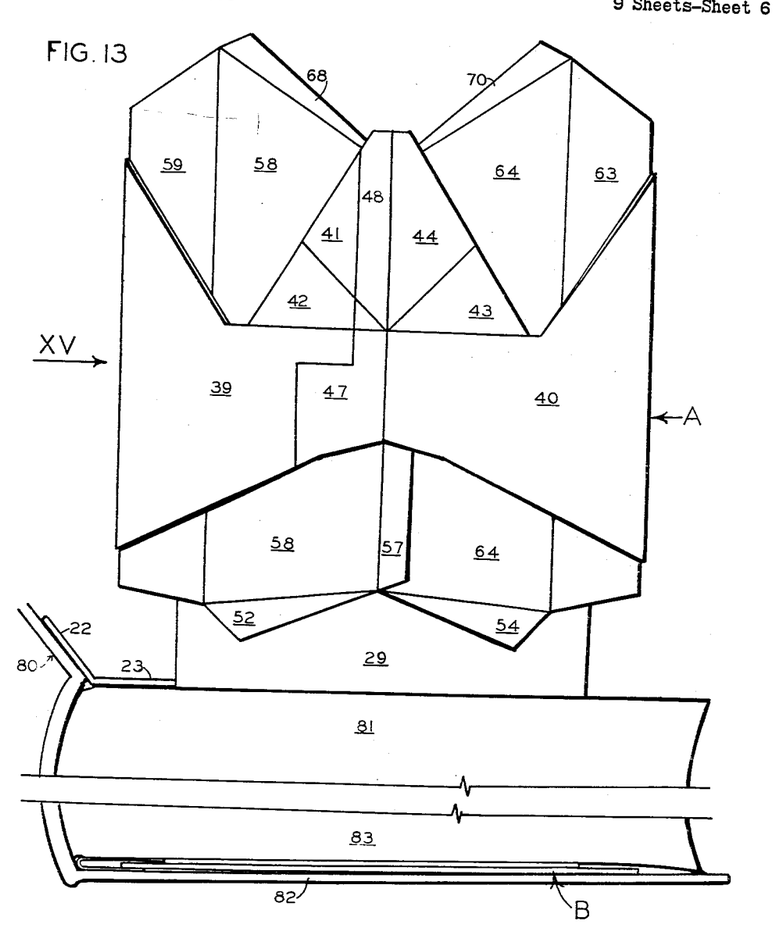
Figure 13 is a rear view showing a pair of the preferred embodiment of my bookrest attached to a book and in its flattened shape as viewed in the direction indicated by the arrow XIII of Figure 3.

Each such bookrest may be carried between the cover of the book and the adjacent cover page, as A is shown in Figure 2 and as B is shown in Figure 13, when such bookrest is in its flattened shape. The book supporting portion of such bookrest is readily flipped out from behind the cover as shown in Figure 2. This portion of the bookrest, indicated as 21, is attached to the book by "flyback" panels 22 and 23 which panels are shown in Figures 3, 6, 7, 12, 13, 14, and 15. The book supporting portion 21 is preferably but not necessarily moved to the position shown in Figure 4 on the outside of the book cover 80 before the "pullback," comprising panels 39, 40, 46, and 47, is pulled from the flat position shown in Figures 3, 4, and 13 through the intermediate position shown in Figure 15 to the book supporting position shown in Figures 1, 5, and 7.

Figures 15, 16, 17:
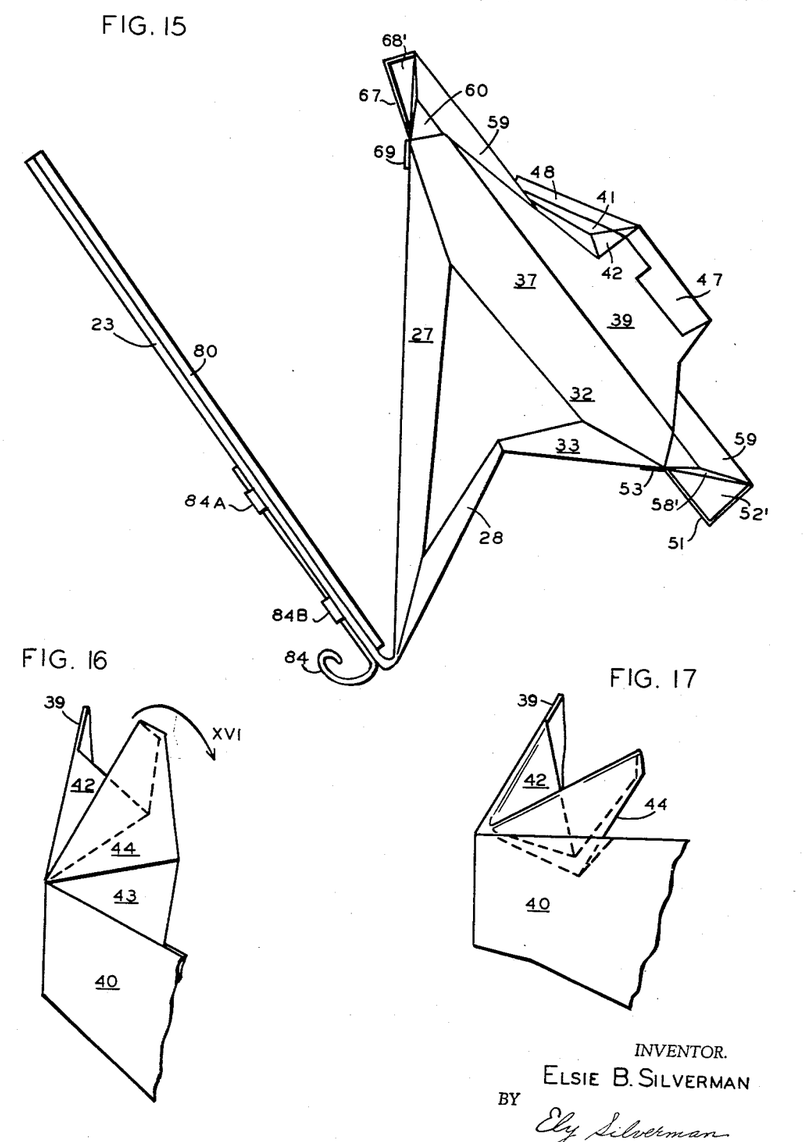
Figure 15 is a side view of the preferred embodiment of my bookrest in a position intermediate between its collapsed position shown in Figure 4 when viewed in the direction of arrow XV in Figure 13 and its rigid expanded shape shown in Figures 1, 5, and 7.
Figure 16 is a perspective view of the rib locking device when in the position shown in Figure 15 and when moving toward the rigid expanded shape of Figures 1, 5, and 7.
Figure 17 is a perspective view of the rib locking device somewhat more advanced than in Figure 16 toward the rigid expanded shape of Figures 1, 5, and 7.

Simultaneous with the backward movement of the pullback (as panels 39 and 40) the rib locking means, composed of panels 41, 42, 43, and 44 (held together by panels 45 and 48), is moved downward in the direction of arrow XVI of Figure 16 as shown in Figures 15, 16, and 17 successively. Thereby the free and adjacent edges of panels 41, 45, 44 and 48 (edges 41.1, 45.1, 44.1, 48.1), contact fold line 57—58 as shown in Figures 8 and 10. Thereby panels 41, 44, 45, and 48 form a rib-locking means by acting as a ribbed compression member to maintain fold line 40—47 at a distance from fold line 57—58.

Figure 14:
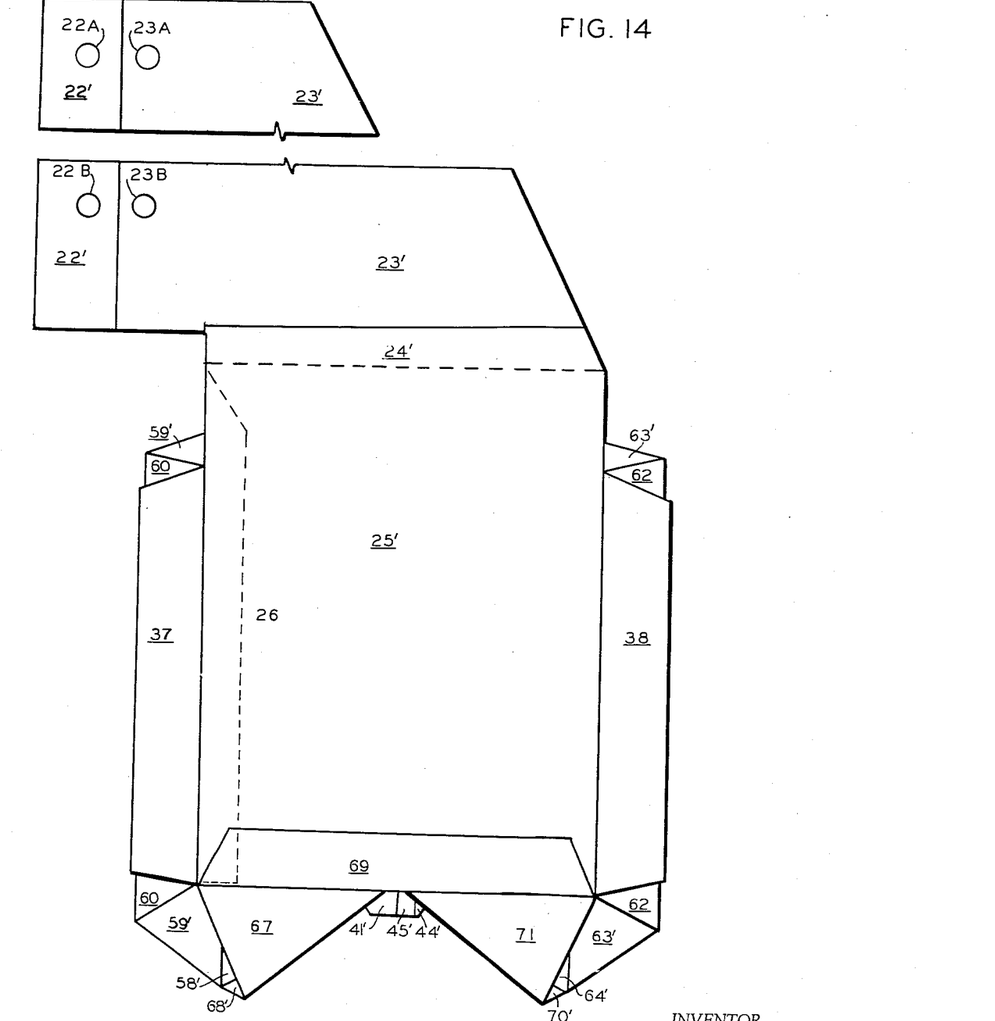
Figure 14 is a front view showing the preferred embodiment of my bookrest in its flattened position, as viewed in the direction indicated by the arrow XIV of Figure 3, and the relation and attachment of the flyback panel, 23, to the remainder of the bookrest.

The above-mentioned movement of panels 39 and 40 also causes panels 37 and 38 to rotate about fold lines 60—61 and 61—62, respectively. Thereby panels 60 and 62 are moved from a position parallel to panel 61, as shown in Fig. 14, to an angle of between 45 and 90 degrees to panel 61, as shown in Figs. 7, 8, 9, and 10. Thereby panels 60, 61, and 62 reinforce each other. The movement of panels 39 and 40, above described, also causes panels 64 and 58 to move from their position parallel to panel 61, as shown in Fig. 13, to the angular position relative thereto shown in Figures 7 through 10; thereby panels 61, 64, and 58 reinforce each other. The backward movement of fold line 40—47 relative to fold line 57—58 due to the backward motion of the "pullback" also simultaneously moves panel 63 from a parallel into an angular relation with panel 64, and panel 59 is moved into an angular relationship with panel 58; in these angular relations which form a series of "L-sections" these panels reinforce each other. These panels (57 through 65) thus move from the flattened shape shown in Figs. 13 and 14 in which shape they have relatively little compressive strength and stability to an expanded and rigid and stable shape in which each panel serves as a ribbing element to a neighboring panel and thus cooperates to form a strong compression member.

Figure 7:
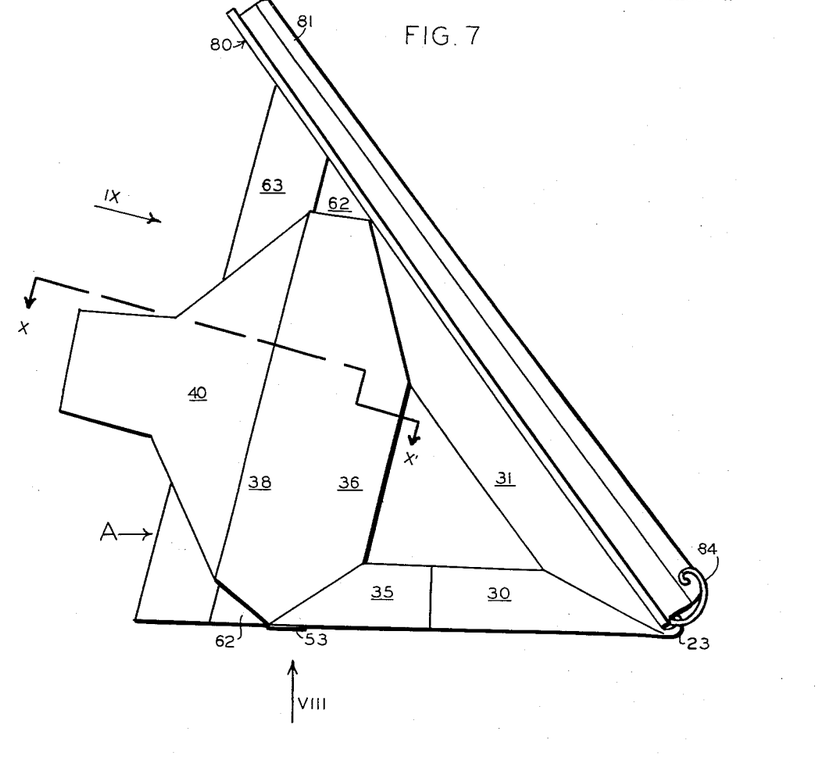
Figure 7 is a side view of the preferred embodiment of my bookrest in its expanded book-supporting shape and position as viewed in the direction indicated by arrow VII in Figure 1.

In the preferred embodiment illustrated in Figs. 1–17 (and also in embodiment C shown in Figs. 18 and 19) it will be noted that (a) the length along the side edges of the panels of the compression resistant member, i.e. along fold lines 58—59, 59—60, 60—61, 61—62, 62—63, 64—65, and 57—58 (and corresponding fold lines in embodiment "C") and that (b) the distances between those side edges are chosen so that the top edge of the L-sections formed by the meeting of the neighboring panels (as 57, 58, 59, 60, 61, 62, 63, 64, and 65) forming the expanded ribbed form of the compression resistant member will evenly contact the load to be supported, i.e. the book cover surface, relatively evenly, as shown in Figs. 1 and 7 (and also in Fig. 18 for embodiment "C") and thereby relatively evenly distribute the compressive burden to be borne by the ribbed structure over all of that ribbed structure. To show the angular relations and important dimensions in the preferred embodiment, Figures 7, 8, 9, 10, 13, 14 and 15 are drawn full scale except for the thickness of the panel members, which thicknesses are shown as greater than they actually are for purposes of clarity in those figures. Thus one inch along dimensions on the embodiment used for supporting the dictionary above described is represented (except for panel thicknesses) by <u>one inch on the attached drawings</u> (this underlined dimension may be modified by amendment according to the scale or reproduction finally used in printing the patent drawings resultant from this application). The resilience of the material used for the "pullback" and the structure adjacent thereto, i.e. panels 57 to 65, is sufficient to maintain the rib-locking means and the above-mentioned panels 57 through 65 in cooperating position to form a rigid structure for support of the book.

Simultaneous with the movement backward of the rib-locking means and associated panel movement to form a strong compression member, panels 29 and 34 are moved from the folded position shown in Fig. 3 through the stage shown in Fig. 15 to the flat position shown in Figs. 1 and 7. Simultaneous with this motion, (a) panel surface 33' moves from a position adjacent panel surface 34' through the position shown in Fig. 15 to that shown in Figs. 1 and 7, and (b) panel surface 28' moves from a position adjacent panel surface 29' through the position shown in Fig. 15 to that shown in Figs. 1 and 7, and (c) panel 35 moves from a flattened position whereat panel surface 35' is adjacent panel surface 34' to a position at right angles thereto, and (d) panel 30 moves from a position whereat panel surface 30' is adjacent panel surface 29' to a position at right angles thereto, and thus (e) fold lines 28—33 and 30—35 are each moved from a position parallel and adjacent to fold line 29—34 to a position at right angles thereto. These movements of the panels adjacent fold lines 28—33, 29—34 and 30—35 are due to (a) the backward movement of the "pullback" into the position shown in Fig. 7 as above described, (b) the simultaneous rotation of panels 38 and 37 from a position parallel to panel 61, as shown in Fig. 14, to an angle of about 60 to 90 degrees thereto as shown in Figures 8, 9, and 10, (c) the rotation of panel 36 about fold line 61—62 (from a position whereat panel surface 36' was adjacent panel surface 61) to the position shown in Figs. 7 through 10 because of the relative unfolding attachment of panel 38 to panel 36 and the attachment of panel 36 to 35, and (d) the rotation of panel 32 about fold line 60—61 from the position as in Fig. 3, wherein panel surface 32' was adjacent to panel surface 61, to the position shown in Figs. 8 and 10, because of the relatively unfolding attachment of panels 32 and 37 to each other and the attachment of panel 33 to panel 32.

Whereas dashed lines are used to indicate fold lines in the patterns of Figs. 11 and 12 (and such dashed lines may, alternatively, be used as cutting lines to form separate panels foldably joined by flexible hinges) the lines between panels 36 and 38 (hereafter called line 36—38) and between panels 32 and 37 (hereafter called line 32—37) are formed of crosses and circles to distinguish those lines (32—37 and 36—38) from all other lines within the outlines of those patterns. Lines 32—37 and 36—38 are thus positioning lines, only, in the preferred embodiment of Figs. 1–17 (and also in embodiment "C"). Lines 32—37 and 36—38 are used to control the positioning of panel 60 with respect to panels 37 and 38, as shown in Fig. 10, so that the position of line 37'—38' will be adjacent to fold line 61—62 and so that the position of line 32'—37' will be adjacent to fold line 60—61, so that the above-described rotation of panels 36 and 32 may take place. It is a feature of this invention that panel 32 stay in substantially the same plane as panel 37 during all positions of the bookrest to accomplish the results described in the paragraph above; similarly panels 36 and 38 remain substantially coplanar; in respect to panels 32 and 37 some resilient bending is expected and permissible, and also with panels 36 and 38. However bending across lines 32—37 and 36—38 is kept at a minimum: a reinforcing plate or sheet, or other member as a staple, as 32s, may be used to aid in maintaining these co-planar relationships by stiffening the connection between panels 32 and 37 and between panels 37 and 38.

The foldable attachment of panel 32, via 27, to 28 and the attachment of panel 36, via 31, to 30 also serves to cause the above-mentioned change in position of fold lines 28—33 and 30—35 relative to fold line 29—34 above described.

Figure 5:
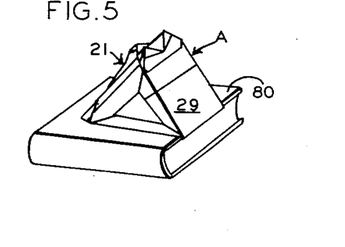
Figure 5 is a perspective view of the book and bookrest of Figures 2, 3, and 4 with the bookrest in its expanded rigid condition on the outside of the book cover.

The firm positioning of the rib-locking means prevents reversal of the positioning of the panels about line 29—34 so that even when the book on which the bookrest is supported is moved backwards and forwards the extended and rigid positioning of panels 28, 29, 30, 33, 34 and 35 in the structure shown in Figures 1 and 5 form a ribbed, rigid, U-sectioned positioning member which serves to maintain the position of the ribbed compression structure, formed of panels 57 through 72, at a fixed distance from the bottom edge of the book cover.

Figure 6:
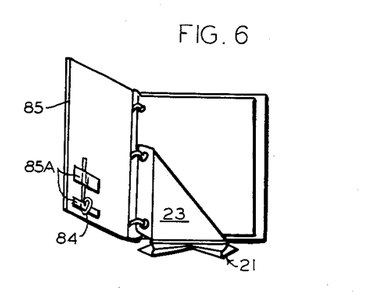
Figure 6 is a top view of a book and bookrest as in Figure 3 wherein the opened book is a loose-leaf book.

Panel 23 is connected to the book supporting members (panels 35—72 in the preferred embodiment) via fold line 23—29 and by the attachment of panel 24 to panel 23. Panel 23, via fold line 23—22 is connected to panel 22. Panel 22 may be glued to the book cover of a bound book as shown in Figure 13. Figure 13 shows a hardcover book, but my invention may also be used with softcovered books. The preferred embodiment shown in Figures 1–7 is dimensioned and adapted for support of the conventional looseleaf notebook binder with snap rings for holding 8 inch x 10 inch or 8½ x 11 inch paper. When the embodiment shown in Figures 1–17 is so used the holes 22A and 22B attach panel 22 and the remainder of the bookrest to the rings of such looseleaf binder. Also, panel 22 may be folded on panel 23 along line 23—22 and panel surfaces 23' and 22' glued to each other to form a doubly strong panel, having holes such as 22A and 22B therein (matching holes 23A and 23B) for attachment to a looseleaf binder as shown in Figure 6.

On pushing the rib locking means (41, 44, 45, 48) from its position shown in Figures 1, 8, and 10 upward through the positions shown in Figures 17, 16, and 15, successively, the ribbed structure composed of panels 57 through 65 is readily collapsed to a flattened position while the substantially flat surface formed by panels 29 and 34, and including line 29—34, and the flat surface formed by panels 30 and 35, and including fold line 30—35, and the flat surface formed by panels 28 and 33, and including fold line 28—33, are readily folded; thereby the flattened structure shown in Figures 3, 4, 13 and 14 is formed, which flattened structure may be returned to the position in which A is shown in Figure 2 and in which B is shown in Figure 13. In this form the bookrest may be readily carried within the book. When in the thus-folded condition the bookrests made with dimensions substantially that of Figures 7, 9, 13, 14 and 15 are between ⅜₃₂ and ⁴⁄₃₂ of an inch thick each.

The steps in the manufacture of a preferred embodiment of my bookrest, such as that shown at A in Figure 1 follows. A single thickness of a stiffened paper such as conventional 3" x 5" filing or index cards are made of, which paper is known as index paper or index card paper of 2-ply weight, is cut into the form of a pattern with an outline as shown by the solid lines in Figure 11 and another such single sheet of similar stiffened paper is made in the form of a pattern with an outline as shown by the solid lines in Figure 12. Fold lines as indicated on those patterns by the dashed lines are then put in the corresponding patterns. Fold line 24'—25' is contacted with fold line 29'—23' and surface 24' glued to the portion of surface 23' then adjacent thereto to maintain that alignment. Fold line 26—27 is placed adjacent edge 25.2 and surface 26 is glued to surface 25' to maintain that alignment. Fold line 44'—48' is put adjacent to fold line 41'—45' and surfaces 47' and 48' glued to the surfaces of panels 41 and 39 adjacent thereto while surfaces 45 and 46 are glued to surfaces 40' and 44' as shown in Figure 10. Thus the panels of Figure 12 are assembled for the embodiment shown at A of Figure 1.

Fold line 57'—58' is placed adjacent fold line 64—65 and fold line 64'—65' is placed half way between and parallel to fold lines 60'—61' and 61'—62'; panel surface 65' is there glued to surface 61', to maintain that alignment of fold line 64'—65' on surface 61' and surface 57' is glued to surface 64 to maintain the above alignment of line 57'—58' to line 64—65.

Fold line 50'—51' is placed adjacent fold line 53'—61' with edge 50.1 near fold line 60'—61' and surface 50 glued to surface 61' to maintain that alignment. Fold line 66'—67' is placed adjacent fold line 61'—69' with edge 66.1 adjacent fold line 60'—61' and surface 66' glued to surface 61' to maintain that alignment.

Fold line 55'—56' is placed adjacent fold line 53'—61' with edge 56.1 adjacent fold line 61'—62' and surface 56' glued to surface 61' to maintain that alignment.

Fold line 71'—72' is placed adjacent fold line 61'—69' with edge 72.1 near fold line 61'—62' and surface 72' glued to surface 61' to maintain that alignment. The panels of Figure 12 are thus assembled for the embodiment shown at A or B of Figure 1.

The thus assembled group of panels of Figure 12 is then attached to the thus assembled group of panels of Figure 11 as follows: Fold line 61'—69' is placed adjacent edge 25.1 and surface 69 glued to surface 25 to maintain that alignment.

The middle of fold line 53—61 is placed adjacent the middle of edge 34.1 as shown in Figures 8 and 10 and surface 53 glued to surface 34 to maintain that alignment. The middle of fold line 61—69 is placed adjacent the middle of edge 25.1 and surface 69 glued to surface 25 to maintain that alignment. Panel surface 38' is glued to planel 62 with line 36'—38' adjacent fold line 61—62. Panel surface 37' is glued to panel 60 with fold line 60—61 adjacent fold line 32'—37'. This completes the assembly of book support A.

The left hand member, B, of Figure 1 has the panels of pattern 11 assembled exactly as above, but pattern of Figure 12 is flipped over so that surface 69' is glued to surface 25' and surface 53 is glued to surface 34' inasmuch as the bottom surface of the bookrest at B of Figure 1 would show surface 34' and 29' and the top would show surface 25.

In the case of bound books panel 22 in a bookrest such as A of Figure 1 would be attached to the inside surface of the cover of the book with fold line 23'—22' adjacent the binding as shown in Figure 13. It should be noted that panels 51 and 52 (and also 54 and 55) on the bottom of bookrest A and panels 67 and 68 (and also 70 and 71) on the top are made so as to lie flat in the folded position, as shown in Figure 13 and Figure 14, yet to lie flat in the rigid expanded book supporting condition (as shown in Figures 8 and 10). They thus serve to hold the ends of the ribbing panels to which attached in position in the book supporting position and so improve the ribbing action by fixing the panels in their proper place. These particular panels, in the preferred embodiment shown in Figures 1–16 are desirable but can be eliminated as they are a manufacturing inconvenience, and inasmuch as the rib locking means (panels 39 through 47) serve to lock the ribbing means (panels 57 through 60 and 62 through 65) in place in the preferred embodiment shown in Figures 1 through 17.

The patterns of Figures 11 and 12 are drawn to scale, although not full scale, and illustrate the relations of the various panels to each other. These patterns may also be used to form the bookrest as above described, and are the preferred method of making those bookrests by hand. When it is desired to make the bookrest by machine the fold lines of Figure 12, such as 27—28, 30—31, 28—33, 30—35, 27—32, 32—33, 35—36, and 36—31 which are more difficult to fold by machine, may be replaced by cuts and the panels adjacent thereto be joined by flexible hinges of material that are commonly available, such as thin sheets of linen or flexible plastic such as cellophane or polyethylene. Further, the aforementioned fold lines even if not cut may be reinforced by plastic or other flexible hinge material as desired. I have found that such reinforcements are not necessary but are desirable to increase the life of hinges such as along fold lines 32—33, 33—28, 30—35 and 35—36 which fold lines are subjected to the greatest rotations from the expanded rigid position to the flattened shape of the bookrest. The fold lines along the compression members 57 through 64 may be reinforced by stiff thin wire as of .005 inch diameter running along the length of the hinge or fold line.

Figure 18:
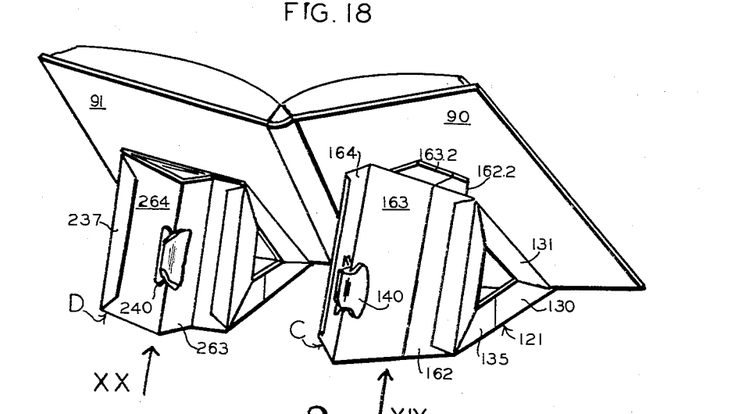
Figure 18 is a perspective view of an open book being supported by bookrests made according to other embodiments of my invention.
Figure 19:
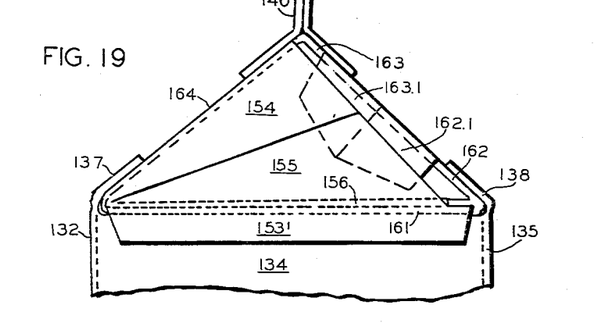
Figure 19 is a bottom view of an embodiment of my invention as viewed in the direction indicated by arrow XIX of Figure 18.
Figure 20:
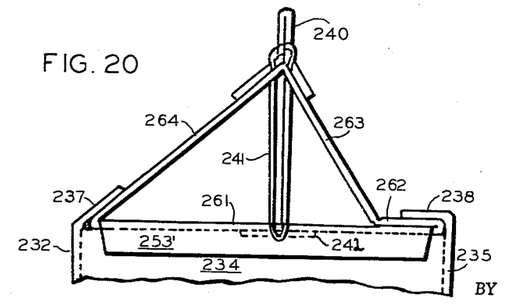
Figure 20 is a bottom view of an embodiment of my invenetion as viewed in the direction indicated by arrow XX of Figure 18.

While the embodiment of Figures 1 through 17 illustrate the preferred embodiment of my invention, it is also my intention to disclose and claim the embodiments shown in Figures 18, 19, and 20. Figures 1 through 17 show the "M-shaped" back in detail in Figures 8, 9 and 10. This appellation, "M-shaped," is given to characterize the relations of the ribbing members 58, 59, 60, 62, 63, and 64 to the panel 61. A somewhat similar configuration of ribbing members is shown in Figures 11 and 12 of my application Serial No. 346,679 of which this is a continuation in part.

Figure 18 herein shows a book having a bookrest supporting each cover thereof, with bookrest C adjacent cover 90 and bookrest D adjacent cover 91. While it is my intention that the bookrest be used in pairs of similar bookrests Figure 18 is to show the appearance of two different types of book supports in their operating position. Bookrest C is shown in Figure 19 as viewed along the direction of arrow XIX of Figure 18 and bookrest D is shown as viewed along the direction of the arrow XX in Figure 18. Figures 18 through 20 are not scale drawings.

Bookrest C is made of two parts; one part is identical to that shown in Figure 12 except that panels 39 through 47 are removed therefrom. The second part is similar, generally, to the pattern shown in Figure 11.

As the panels are similar, the numbering of the panels shown in Figures 18 and 19 is the same as that shown for Figures 11 and 12 except that the numbers for embodiment "C" will be 100 units higher, i.e., the panel 164 in embodiment "C" (Figures 18 and 19) is similar to panel 64 in Figures 1–17. This embodiment will also lie flat between the covers of a book in which it is transported—as shown at B in Figure 13—when this embodiment is collapsed from its rigid book supporting form. The movement of panels 164 and 162 from a position parallel to panel 161 in the folded flat form of this embodiment helps to extend panels 133 and 128 and 135 and 130 and the panels adjacent thereto into a coplanar position as discussed in relation to similar panel of embodiment A and their motions on backward motion of the "pullback" means. The locking effect of flaps 162.2 and 162.1, 163.1 and 163.2 discussed below maintains this cooperative relation between the compression resistant as well as the other elements of this embodiment in the book supporting arrangement of this embodiment.

A tab indicated generally as 140 is attached to panels 164 and 163 in order to provide a means with which to pull backward the book supporting members generally indicated by 121 in Figure 18.

In embodiment "C" the panels 66 through 68, 57 through 60, and 50 through 52 are eliminated and the distances between the fold lines 161—162 and 162—163 between fold lines 163—164 and 163—162, and between fold lines 163—164 and 164—165 are twice those for the distances between corresponding fold lines shown in Figure 11 for the preferred embodiment "A." In order to have an even distribution of the weight of the fraction of the book supported by each bookrest over the compression resistant member of such bookrest, the trapezoidal ribbing members, as 262, 263, and 264 are shaped as shown in Figures 19 and 18 to obtain the weight supporting relation of the L-sections as shown in Figure 7 and as discussed above (column 5). Panels 154 and 155 (shown) at the bottom of the bookrest and corresponding panels 170 and 171 (not shown) at the top thereof serve as means to hold in cooperating position the panels that rib each other to help form the rigid ribbed compresion resistant member, especially for so long as the book contacts and is supported by said compression member. A set of auxiliary flaps 162.1 and 163.1 foldably attached to each other and to the bottom of panels 162 and 163 serve to render rigid the bottom portion of the fold line 162—163 as shown in Fig. 18. A similar set of flaps 162.2 and 163.2 is also foldably attached to the top of panels 162 and 163 to render rigid the upper portion of fold line 162—163. Such flaps are preferably hooked under the adjacent panes, as 154 and 155, as shown in Figure 19, although these auxiliary flaps may be used in the position shown in Figure 18. The joining of the two parts is as disclosed for the embodiment "A" of Figs. 1–17.

Embodiment D is made of two parts: one part is identical to that shown in Figure 12 except that panels 39 through 47 are removed and a light fold line may be made along line 36—38 and line 32—37; the other part is roughly similar to Figure 11 as modified by the embodiment "C" of Fig. 19. In embodiment "D" the compression member is also essentially but one half of that shown in Fig. 11, i.e. the panels 57—60, 66—68, and 50—52 are eliminated and the distances between fold lines 261—262, 262—263, 263—264, and 264—265 are twice those for the corresponding panels in the above-discussed preferred embodiment "A"; additionally, panels 54 through 56 and 70 through 72 are eliminated and the length of the fold lines 62—63 and 63—64 are all the same as 61—62. Insofar as the panels are similar, the numbering of the panels shown in Figure 18 and Figure 20 is the same as that shown for Figures 11 and 12 except that the numbers for embodiment "D" will be 200 units higher, i.e. the panel 264 in embodiment "D" is similar to panel 64 in Figures 1 through 17. Additionally, a rubber band 241 passes to a reinforced portion of panel 261, i.e. to panel 242 to fix the position of panels 264 and 263 and 262 relative to panel 261.

As the width of panel 264 plus width of panel 263 is equal to the width of panel 261 plus the width of panel 262, this assembly will lie flat in its collapsed position as shown for embodiment A in Figure 2 and for embodiment B in Figure 13. Element 240 is a pullback flap similar in purpose and function to element 140 of embodiment C. The movement of panels 264 and 262 from a position parallel to 261 in the folded collapsed position of this embodiment to the position shown in Figure 20 helps to extend panels 233 and 228 and 235 and 230 and the panels adjacent thereto into a coplanar position as discussed in relation to similar panels of embodiment A and their motions on the backward motion of the "pullback" means in embodiment A. The locking effect of member 241 maintains this cooperative relation between the compressive as well as the other elements of this embodiment.

In order to hold down the pages of an open book on using a bookrest according to my invention, utilizing either embodiments A, B, C, or D, a means moveable to a flattened position between the cover and the pages of the book, such means being adapted to hold the pages toward the book cover, may be attached to panel 23 as shown in Figure 15 or may be attached (via attachment 85A) to the inside surface of a book cover (as 85) as shown in Figure 6. Such means may be a J-shaped resilient wire, 84, of 0.05 to 0.10 inch thickness. The attachment may be as shown by tabs 84A and 84B along or parallel to the edge 23.2 of panel 23 but is preferably as shown by tabs 84C and 84D, on surface 25' of panel 25 near fold line 25'—31'. Such attachments are arranged to allow the loop of the J to project beyond the edge of the book, as shown in Figures 7 and 15, when needed, and to be slid back into the outline of the book cover when not in use.

It is to be understood that the above described specific forms of my invention are preferred embodiments and that many modifications and changes may be made therein without departing from the spirit of my invention. For instance, the angle at which the book is held may be varied by varying the lengths of the members with respect to each other without departing from the spirit of my invention. Similarly, the absolute size of the bookrest may vary; I have found the dimensions of the preferred embodiment above described to be suitable for the most usual sizes of notebooks and college textbooks, but proportionately larger or smaller sizes may be used for larger or smaller books. It is, therefore, intended that the scope of my invention be limited only by the attached claims.

I claim:

1. In a bookrest for supporting a book in inclined position on a relatively horizontal surface, said book having a cover, the combination of panels all foldably and permanently connected which includes a rigid compression structure, this rigid structure comprising a first flat panel with a folding rib structure attached thereto, this folding rib structure comprising a flat trapezoidal panel contacting the first flat panel along a first edge of the trapezoidal panel, and being flexibly and permanently connected thereto, and rib structure holding means extending from a second edge of such trapezoidal panel, which second edge is opposite from said first edge, to the first flat panel and which rib structure holding means is permanently and flexibly attached to and rigidly holds the trapezoidal panel in a plane at an angle to the plane of the first panel whereby said flat trapezoidal panel, in the operating book supporting position of the bookrest acts as a rib to reinforce and make rigid the first panel; a flat inclined member flexibly joined to the upper edge of said rigid compression structure and extending to the lower edge of a cover of said book; and a further foldable member flexibly joined to a lower edge of said rigid compression structure and extending to the lower edge of said book cover.

2. In a bookrest for supporting a book in inclined position on a relatively horizontal surface, said book having a cover, the combination of foldably and permanently connected panels which includes a rigid compression structure, this rigid structure comprising a first flat panel with a folding rib structure attached thereto, this folding rib structure comprising a flat trapezoidal panel contacting the first flat panel along a first edge of the trapezoidal panel and being flexibly and permanently connected thereto, and rib structure holding means extending from a second edge of such trapezoidal panel, which second edge is opposite from said first edge, to the first flat panel, said rib structure holding means being permanently and flexibly attached to both said trapezoidal panel and said first flat panel, the trapezoidal panel being firmly held in a plane at an angle to the plane of the first panel in the operative book supporting position of the bookrest, a flat inclined member flexibly and permanently joined to the upper edge of said rigid compression structure and extending to a point substantially on the same horizontal level as the bottom of said compression member and removed therefrom, and a further foldable member flexibly and permanently joined to a lower edge of said rigid member and extending to substantially the same point as that to which said flat inclined member extends.

3. In a bookrest for supporting a book in inclined position on a relatively horizontal surface, said book having a cover, the combination of foldably and permanently connected panels which includes a rigid compression structure, this rigid structure comprising a first flat panel with a folding rib structure attached thereto, this folding rib structure comprisig a flat trapezoidal panel contacting the first flat panel along a first edge of the trapezoidal panel and being flexibly and permanently connected thereto, and rib structure holding means extending from a second edge of such trapezoidal panel, which second edge is opposite from said first edge, to the first flat panel said rib structure holding means being permanently and flexibly attached to both said trapezoidal panel and said first flat panel, said trapezoidal panel being firmly held to the plane of the first panel; a flat inclined member flexibly and permanently joined to the upper edge of said rigid compression structure and extending to a point substantially on the same horizontal level as the bottom of said compression member and removed therefrom; and a further foldable member flexibly and permanently joined to a lower edge of said rigid compression structure and extending to substantially the same point as that to which said flat inclined member extends, and said foldable member being firmly held in extended form when said bookrest is in its operating book supporting position by means attached permanently to said further foldable member.

4. In a bookrest for supporting a book in inclined position on a relatively horizontal surface, said book having a cover, the combination of foldably and permanently connected panels which includes a rigid compression structure, this rigid structure comprising a first flat panel with a folding rib structure attached thereto, this folding rib structure comprising a flat trapezoidal panel contacting the first flat panel along a first edge of the trapezoidal panel and being flexibly and permanently connected thereto, and rib structure holding means extending from a second edge of such trapezoidal panel, which second edge is opposite from said first edge, to the first flat panel and being permanently attached thereto, said rib structure holding means being permanently and flexibly attached to both said trapezoidal panel and said first flat panel, said trapezoidal panel being firmly held by said holding means in a plane at an angle to the plane of the first panel in the operating book supporting position of the bookrest; a flat inclined member flexibly and permanently joined to the upper edge of said rigid compression structure and extending to a point substantially on the same horizontal level as the bottom of said compression member and removed therefrom; and a further foldable member flexibly and permanently joined to a lower edge of said rigid compression structure and extending to substantially the same point as that to which said flat inclined member extends and said foldable member being firmly held in extended form when said bookrest is in its operating book supporting position by means attached permanently and directly to said further foldable member and also permanently and fixedly to at least one element of said folding rib structure.

5. A structure according to claim 4 wherein said foldable member is automatically brought to its extended flat unfolded form when said bookrest is brought to its operative expanded form by movement of the rib structure holding means to its operative position.

6. A structure according to claim 5 wherein both the rib structure means and rib structure holding means are brought to their operative book supporting position and there held by the one motion of bringing the rib structure holding means to its operative position.

7. A bookrest as in claim number 4 and which bookrest is adapted to foldably collapse to a flattened structure and which bookrest is made of panels each about 1/100 inch thick.

8. A bookrest as in claim number 7 in which at least two ribbing elements, each comprising a trapezoidal flat panel, are hingedly attached to the ribbed panel and the lines of attachment to the ribbed panel of at least two of these ribbing panels are adjacent to each other.

References Cited in the file of this patent

UNITED STATES PATENTS

| | | |
|---|---|---|
| 2,225,830 | Harris | Dec. 24, 1940 |
| 2,466,599 | Larkin | Apr. 5, 1949 |

FOREIGN PATENTS

| | | |
|---|---|---|
| 329,002 | Germany | Nov. 11, 1920 |